Nov. 13, 1945.    W. L. SHAFFER    2,388,769
MEASURING AND CONTROLLING APPARATUS
Filed May 25, 1943    2 Sheets-Sheet 1

INVENTOR.
WILLIAM L. SHAFFER
ATTORNEY

Nov. 13, 1945.  W. L. SHAFFER  2,388,769
MEASURING AND CONTROLLING APPARATUS
Filed May 25, 1943  2 Sheets-Sheet 2

INVENTOR.
WILLIAM L. SHAFFER
ATTORNEY.

Patented Nov. 13, 1945

2,388,769

UNITED STATES PATENT OFFICE 2,388,769

MEASURING AND CONTROLLING APPARATUS

William L. Shaffer, Philadelphia, Pa., assignor to The Brown Instrument Company, Philadelphia, Pa., a corporation of Pennsylvania Application May 25, 1943, Serial No. 488,401

8 Claims. (Cl. 172—239)

The present invention relates to instrumentalities for measuring and/or utilizing for control and analogous purposes small unidirectional potentials.

An object of the present invention is to provide novel and effective means for converting a small unidirectional potential into an alternating potential of one phase or of opposite phase accordingly as said unidirectional potential deviates in one direction or the other from a predetermined value. It is an object of the invention also to provide such conversion means in which the magnitude of the derived alternating potential varies in accordance with the extent of departure of the unidirectional potential from said predetermined value. A further and more specific object of the invention is to provide such conversion means in which the derived alternating potential is of commercial frequency.

According to the present invention a multielement electronic valve is utilized in which there are two control electrodes acting in tandem on a single electronic stream. An alternating potential or signal of suitable magnitude and of commercial frequency is impressed between the cathode and one of the control electrodes, and an alternating potential of the same frequency but displaced 180° with respect to said first mentioned alternating potential is impressed between the cathode and the second of the control electrodes. This second mentioned alternating potential may conveniently be obtained by providing a biasing resistor in the cathode circuit of the valve and by connecting the second of the control electrodes to the negative end of said biasing resistance. The small unidirectional potential which it is desired to convert into an alternating potential of one phase or of opposite phase accordingly as it deviates in one direction or the other from a predetermined value is impressed between the cathode and the second of said control electrodes. A unidirectional potential is impressed on the anode or output circuit of the valve.

With this arrangement, the anode or output current of the electronic valve includes an alternating component of twice the frequency of the alternating potential applied to the first mentioned control electrode when the small unidirectional potential has a predetermined value. Upon deviation of the small unidirectional potential from said predetermined value, the anode or output current of the valve will include an alternating component of the same frequency as the alternating potential applied to the first mentioned control electrode and of the same phase. Upon deviation in the small unidirectional potential in the opposite direction from said predetermined value, the anode or output current of the valve will include a component of the same frequency as the alternating potential applied to said first mentioned control grid but displaced 180° in phase therewith.

Thus, when the small unidirectional potential is a predetermined value, the anode or output current of the valve will include an alternating component of twice the frequency of the alternating potential applied to the first mentioned control electrode and upon deviation of the small unidirectional potential from said predetermined value, the anode or output current of the valve will include an alternating component of the same frequency as the alternating potential applied to the first mentioned control electrode but of one phase or of opposite phase depending upon the direction of the change in the small unidirectional potential from said predetermined value. In addition, the magnitude of the alternating component of the anode or output current of the valve which is of the same frequency as the alternating potential applied to the first mentioned control electrode will vary in accordance with the extent of the change in the small unidirectional potential from said predetermined value.

The production of an alternating potential of one phase or of opposite phase in accordance with the variations from a predetermined value of the said small unidirectional potential in this manner is characterized by the simplicity and effectiveness of the equipment required and in particular by the fact that it does not include mechanically movable parts such as are required by certain methods heretofore proposed for converting small unidirectional potentials into alternating current potentials.

Accordingly, it is a primary object of my present invention to provide simple and effective means involving no mechanically movable parts whatever for converting a small unidirectional potential into an alternating potential of one phase or of opposite phase as the unidirectional potential deviates about a predetermined value.

A further object of the invention is to effect a novel and desirable combination of means for converting a unidirectional potential derived from a potentiometric or bridge measuring network to thereby produce a novel and relatively simple form of self balancing potentiometric or bridge measuring instrument which may follow the approved practices of the art in respect to many of its features.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Figure 3:
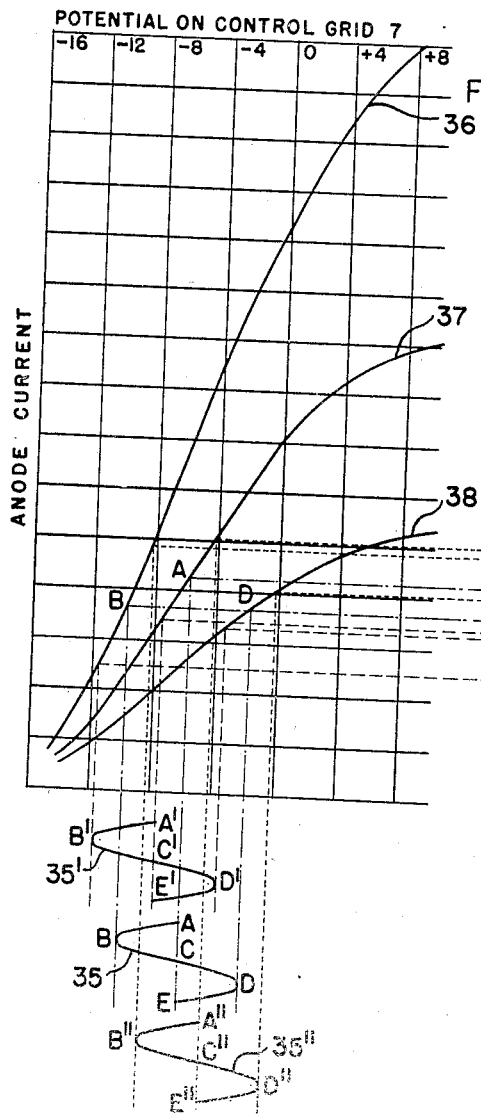
Figure 4:
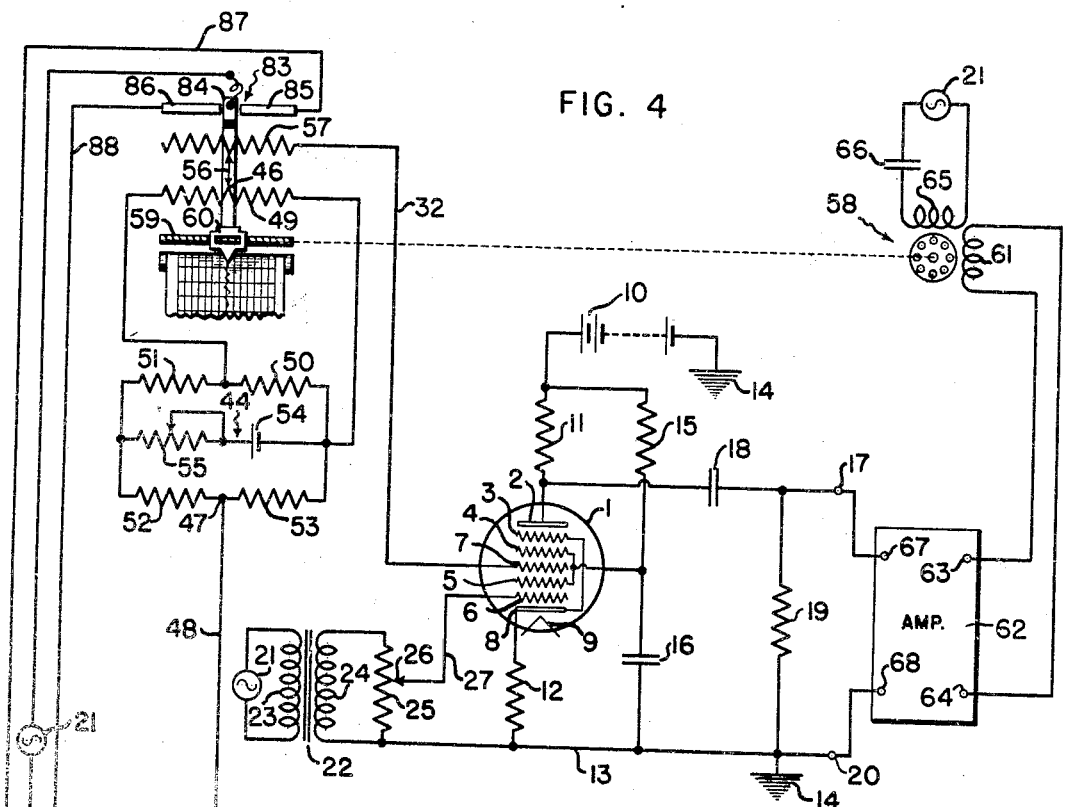
Figure 5:
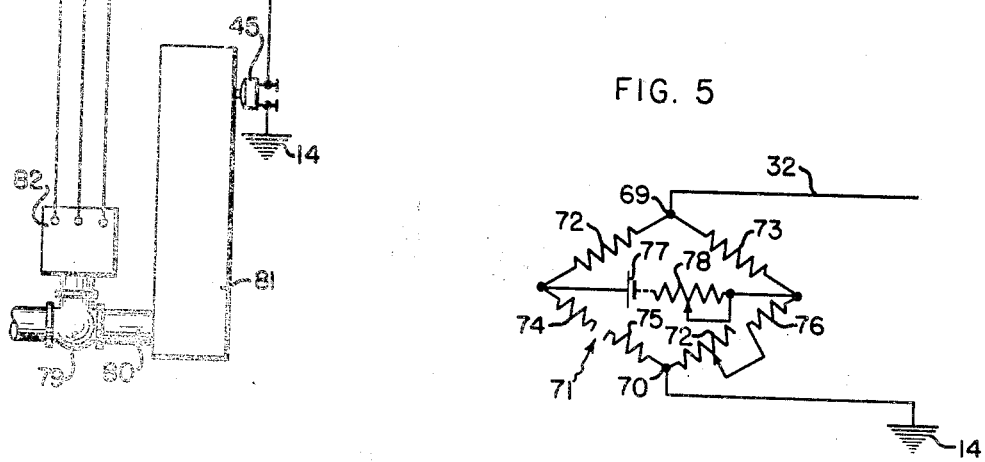

Fig. 3 is a diagram showing a family of curves of anode or output current as ordinate, with the voltage of the second mentioned control electrode as abscissa, and with the voltage of the first mentioned control electrode held constant at various bias voltages; and also illustrates the anode or output current waves obtained for different unidirectional potentials applied to the second mentioned control electrode of the electronic valve;

Fig. 4 is a diagrammatic representation of potentiometric measuring apparatus including unidirectional potential conversion and amplifying means; and Fig. 5 shows a bridge network which may be utilized in the arrangement of Fig. 4 in lieu of the potentiometric measuring network.

Figure 1:
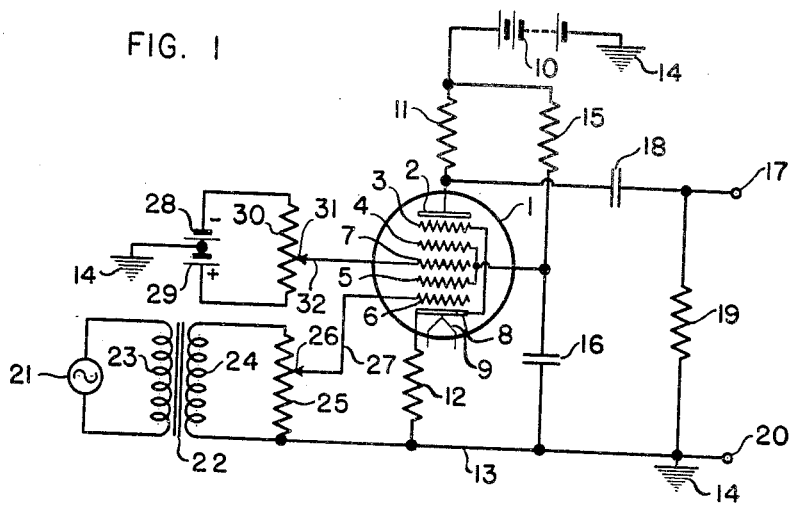
Fig. 1 is a diagrammatic representation of one embodiment of the unidirectional potential conversion means of my invention.

In Fig. 1 the reference numeral 1 indicates an electronic valve or space discharge device which preferably is of the type known and sold commercially as the 6L7 and includes a plate 2, a suppressor grid 3, screen grids 4 and 5, control grids 6 and 7, a cathode 8, and a heater filament 9. Energizing current is supplied to the heater filament 9 from a suitable source not shown in order to avoid confusing the drawing. The suppressor grid 3 is internally connected to the cathode 8, and the screen grids 4 and 5 are internally connected to each other. Plate voltage is supplied valve 1 from a source of direct current voltage indicated as a battery 10 through a circuit which may be traced from the positive terminal of the battery through a load resistor 11 to the plate 2, cathode 8, a cathode biasing resistance 12 to a conductor 13 which is grounded at 14, and through ground 14 to the negative terminal of battery 10. Screen voltage is supplied valve 1 from the battery 10 through a circuit which may be traced from the positive terminal of battery 10 through a resistor 15 to the screen grids 4 and 5, from the latter through a condenser 16 to the grounded conductor 13 and through ground 14 to the negative terminal of battery 10.

The terminal indicated by the reference character 17 comprises one output terminal of the valve 1 and is connected to the plate 2 through a blocking condenser 18. The terminal 20 shown connected to the grounded conductor 13 comprises the second output terminal of valve 1 and is connected by a suitable resistance 19 to the terminal 17. The blocking condenser 18 is provided to prevent the direct current component of plate current of valve 1 from flowing in the output circuit while at the same time facilitating the transmission of the alternating component of the plate current to the output circuit.

Valve 1 is provided with two separate input circuits, the first of which includes the control grid 6 and the second of which includes the control grid 7. The cathode biasing resistance 12 operates to impress a pulsating negative bias on both of the control grids 6 and 7. An alternating potential or signal is impressed on the control grid 6 from a source of alternating current, desirably of commercial frequency although not necessarily so, indicated at 21 through a transformer 22 having a primary winding 23 which has its terminals connected in series with the source 21, and also having a secondary winding 24. The terminals of secondary winding 24 are shunted by a potentiometer resistance 25. One end terminal of resistance 25 is connected to the grounded negative conductor 13 and a contact 26 which is slideable along the length of resistance 25 is connected through a conductor 27 to the control grid 6. Thus, an alternating potential of the frequency of source 21 and of a magnitude depending upon the adjustment of contact 26 along the length of resistance 25 is impressed on the input circuit of valve 1 including control grid 6. This input circuit may be traced from the control grid 6 through conductor 27 to contact 26, resistance 25 to grounded conductor 13, and the cathode biasing resistance 12 to the cathode 8.

A unidirectional potential of low intensity is impressed on the input circuit of valve 1 including the second control grid 7 from a source of unidirectional electromotive force shown as comprising a pair of identical batteries 28 and 29 which are connected additively in series with each other and in series with a potentiometer resistance 30. The point of connection of batteries 28 and 29 is connected to ground 14 and a contact 31 which is in engagement with resistance 30 and is slideable therealong is connected by a conductor 32 to the control grid 7. When the contact 31 is at a position midway the ends of resistance 30 no potential difference will exist between the contact 31 and ground 14. Under this condition the control grid 7 will be at the potential of ground 14 which is the same as that at the lower and negative terminal of cathode biasing resistance 12. With the contact 31 displaced downwardly from that intermediate position, however, the contact 31 will be rendered positive in potential relatively to ground potential, and therefore, in this case the negative potential on control grid 7 will be reduced. Conversely, when the contact 31 is displaced upwardly the contact 31 will be rendered negative in potential, and under this condition, the negative potential on the control grid 7 will be increased. Superimposed on this potential applied to control grid 7 is a fluctuating potential drop derived from the cathode biasing resistance 12. This fluctuating potential drop is impressed on control grid 7 through a circuit which may be traced from cathode 8, biasing resistance 12, conductor 13, ground 14, elements 28, 29, 30 and 31 and conductor 32 to control grid 7.

Figure 2:
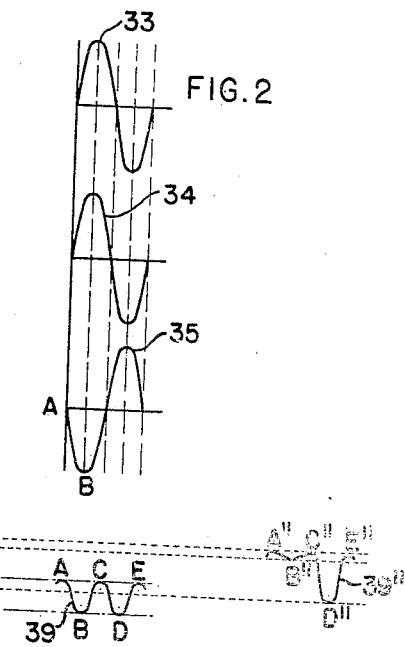
Fig. 2 is a diagram showing the voltages on the two control electrodes of the electronic valve and also the voltage drop across the cathode biasing resistance.

In Fig. 2 the curve 33 illustrates the wave shape of the alternating potential impressed between the control electrode 6 and the cathode 8. Curve 34 indicates the alternating component of the pulsating potential drop produced across the cathode biasing resistance 12 by the anode or output current flow from valve 1 obtained when the voltage wave 33 is impressed on control grid 6. It will be noted that the alternating current waves 33 and 34 are in phase with each other. This is illustrative of the fact that when the potential applied between the control grid 6 and cathode 8 has the instantaneous polarity tending to drive the control grid 6 less negative or even positive relative to the potential of cathode 8, the instantaneous polarity of the alternating component of the potential drop produced across the biasing resistance 12 by the cathode current flow therethrough is such as to tend to increase the potential of the upper end of resistance 12 relatively to the potential of the lower end.

Curve 35 of Fig. 2 illustrates the wave shape of the alternating component of the potential drop produced across the biasing resistance 12 which is impressed between the control grid 7 and cathode 8. It will be noted that this alternating current wave is displaced by 180° from the alternating current waves 33 and 34. This indicates that when the alternating potential between the control grid 6 and cathode 8 is increasing in the direction tending to make the control grid 6 less negative or even positive relative to the potential of cathode 8, the alternating potential between the control grid 7 and cathode 8 is increasing in the direction to make the control grid 7 negative with respect to the potential of cathode 8. Such operation is obtained since the lower end of biasing resistance 12 to which the control grid 7 is connected is driven negative with respect to the potential of the cathode 8 when the control grid 6 is driven less negative or positive relatively to the potential of cathode 8.

In Fig. 3 there is illustrated three curves 36, 37 and 38 of a family of curves representing the anode or output current of valve 1 as the ordinate, and the voltage or potential of control grid 7 as the abscissa. Curve 36 is obtained when the potential between the control grid 6 and cathode 8 is a negative potential, which for purposes of explanation may be termed $eg_1$, and is held constant as the potential of the control grid 7 is varied throughout a range indicated by the arbitrary figures −16 to +8. Curve 37 is obtained when the potential of the control grid 6 is held constant at a value, conveniently termed $eg_2$, which is more negative than the potential $eg_1$ and the potential of the control grid 7 is varied throughout the same range. Similarly, curve 38 is obtained when the potential of the control grid 6 is held constant at a value of $eg_3$ which is more negative that the potential $eg_2$ and the potential of the control grid 7 is varied throughout the same range.

Curve 35 in Fig. 3 represents the alternating component of potential which is impressed between the control grid 7 and the cathode 8. The steady operating potential of the control grid 7 is determined by the magnitude of the applied unidirectional potential from the batteries 28 and 29 and the slidewire resistance 30.

With the steady operating potential of the control grid 7 at a predetermined value, the anode or output current of the valve 1 for the point A on the curve 35 is the value obtained at the intersection of curve 37 with the ordinate for curve 35 at the point A and is illustrated at the point A on the curve 39. The anode current of valve 1 for the point B on the curve 35 is the value obtained at the intersection of curve 36 with the ordinate for curve 35 at the point B. By reference to Fig. 2 it will be noted that as the curve 35 swings in the negative direction from the point A to point B that the curve 33, representing the potential between control grid 6 and cathode 8, swings in the positive direction to a value which may desirably be $eg_1$. Curve 36 of Fig. 3 is obtained when the potential on control grid 6 is $eg_1$, and therefore, the anode current flow from valve 1 at the point B on curve 35 is the value existing at the point of intersection with curve 36 of the ordinate for curve 35 at the point B. Thus, the anode current flow is the value indicated by the point B on the curve 39. The anode current flow through valve 1 for the points C, D and E on curve 35 may be obtained in a similar manner. It is noted that the points A, C and E are superimposed upon each other on the curve 37. Therefore, the anode current is of the same magnitude at each of the points A, C and E as will be seen by reference to curve 39. The anode current flow through valve 1 at the point D is the value obtained at the point of intersection with curve 38 of the ordinate for curve 35 at the point D. The point D on curve 35 is the point of most positive swing. At this point of most positive swing on curve 35, the curve 33 of Fig. 2 is at the point of most negative swing, which point may desirably have a value of $eg_3$. Curve 38 of Fig. 3 is obtained when the potential on control grid 6 is $eg_3$, and accordingly, the anode current flow from valve 1 at the point D on the curve 35 is the value existing at the point of intersection with curve 38 of the ordinate for curve 35 at the point D. Thus, the anode current flow is the value indicated at the point D on curve 39.

Referring to curve 39 on Fig. 3 it will be noted that the anode current has a maximum value at the points A, C and E and has a minimum value at the points B and D. Thus, the anode current consists of a second harmonic of the alternating voltage or signal impressed between the control grid 6 and cathode 8 from the source 21. That is to say, the frequency of the anode current wave 39 is exactly twice that of the current wave 33 impressed on the control electrode 6. Moreover, since the maximum points A, C and E are all of the same value and the minimum points B and D are of the same value, the voltage wave 39 is a substantially pure second harmonic.

When the operating point for the voltage wave 35 is moved to the right or to the left from the position shown in Fig. 3 an alternating component of the fundamental frequency of the source 21 is introduced into the anode current of the valve 1. This alternating component will be either in phase with the voltage wave 33 impressed on the control grid 6 of valve 1 or displaced 180° in phase therewith depending upon the direction in which the operating point of the wave 35 is moved. In Fig. 3 the curve 35' illustrates the case where the voltage wave 35 has been moved to the left, indicating that the unidirectional potential applied to the control grid 7 has been increased in the negative direction. Likewise, the curve 35'' illustrates the case where the operating point of the voltage wave 35 has been moved to the right, indicating that the unidirectional potential applied to the control grid 7 has been made less negative.

Points A', B', C', D' and E' on the curve 35' correspond to the points A, B, C, D and E on the curve 35. The curve 39' of Fig. 3 illustrates the anode current flow through valve 1 which is obtained under this condition of increased negative potential on the control grid 7. Curve 39' is obtained in a manner similar to that in which the curve 39 was obtained and which is explained in detail hereinbefore.

The curve 39'' illustrates the anode current wave which is obtained when the operating point of the curve 35 is shifted to the right as indicated by the curve 35''. The points A'', B'', C'', D'' and E'' of the curve 35'' correspond to the points A, B, C, D and E of the curve 35.

A comparison of curves 39 and 39' shows that the difference in magnitude of the anode current flows between the points A' and B' on the curve 39' is greater than that between the points A and B on the curve 39. The opposite is true at the point D' on the curve 39'. That is to say, the difference in magnitude of the anode current flow at the points C' and D' on curve 39' is smaller than that at the points C and D on the curve 39. The second harmonic of both of the waves are in phase but the current wave 39' includes a component of the fundamental frequency of source 1 which does not exist in the current wave 39.

An analysis of the two current waves 39 and 39' shows that the second harmonic of both of the waves are in phase and that the current wave 39' includes a component of the fundamental frequency of the source 21 which is not included in the current wave 39. Moreover, the component of the fundamental frequency of the source 21 which is present in the current wave 39'' is displaced 180° from the component of said fundamental frequency which is present in the wave 39'.

Thus, with the operating point of the curve 35 at a predetermined point, or in other words, with a given unidirectional potential on the control grid 7, the current wave in the anode circuit of the tube 1 consists of a second harmonic of the current derived from source 21. Upon shift in the operating point of the curve 35 in one direction or the other from said predetermined value, that is, upon a change in the unidirectional potential applied to the control grid 7 in one direction or the other from the given value referred to, a component of current having the fundamental frequency of the source 21 and in phase therewith or displaced 180° in phase is introduced into the anode current wave.

Stated differently, with a unidirectional potential of predetermined value impressed on the control grid 7 an alternating potential of twice the frequency of source 21 will appear at the output terminals 17 and 20 of valve 1. When a more negative unidirectional potential is impressed on the control grid 7, however, an alternating potential component of one phase relatively to the voltage of source 21 and of the same frequency will be produced at the output terminals 17 and 20. A less negative potential on the control grid 7, on the other hand, operates to establish an alternating potential component of the opposite phase relatively to the voltage of source 21 and of the same frequency at the output terminals 17 and 20.

As those skilled in the art will understand, my invention is not restricted to the use of the commercial type 6L7 electronic valve in its practical application, but may utilize any type of electronic valve in which there are two control electrodes acting in tandem on a single electronic stream. For example, the commercial type valves 6J7 and 6AB7 may be utilized. The types 6J7 and 6AB7 are pentodes and when utilized according to my invention the alternating potential from potentiometer resistance 25 may be impressed on the screen or suppressor grid and the unidirectional potential from potentiometer resistance 30 may be applied to the control grid.

The apparatus shown diagrammatically in Fig. 1 and explained by reference to Figs. 2 and 3 embodies the general principals of the present invention. My invention may advantageously be embodied in measuring and/or controlling apparatus and may well be incorporated in a self-balancing potentiometric measuring and/or controlling instrument as has been illustrated, more or less diagrammatically, in Fig. 4.

In Fig. 4 the unidirectional potential impressed on the control grid 7 of the electronic valve 1 is derived from a self-balancing potentiometric network 44 which is arranged to provide a variable potential in opposition to that produced by a thermocouple 45. In particular, the input circuit of the electronic valve 1 which includes the control grid 7 may be traced from ground 14 through the cathode biasing resistance 12 to the cathode 8, the control grid 7, a conductor 32 to the point 46 of the potentiometric measuring circuit 44, the potentiometric measuring circuit point 47, a conductor 48 and the thermocouple 45 to ground 14. The apparatus of Fig. 4 includes provisions for automatically adjusting the circuit connections in a direction and to an extent tending to maintain a potential difference between the points 46 and 47 of the potentiometric network 44 equal and opposite to the electromotive force developed by the thermocouple 45.

The potentiometric measuring circuit 44 is of the split potentiometer type and comprises three branches connected in parallel, one branch including the main potentiometer slidewire resistance 49. The potentiometer slidewire resistance 49 is connected in shunt to a resistance 50 which is connected in series with a resistance 51 to form said one branch. The second branch of the potentiometer includes balancing resistances 52 and 53 and the third branch includes a battery 54 and a resistance 55 which may be adjusted as required to insure a current flow of the desired magnitude through the resistor 49. A sliding contact 56 engages the resistor 49 at the point 46, the position of which along the length of the resistor 49 is varied by the sliding adjustment of the contact 56. The contact 56 is a bridging contact connecting the point 46 of the resistor 49 to a corresponding point of a slidewire resistor 57 which is positioned alongside the resistor 49.

Although not shown, it will be understood that suitable calibrating provisions comprising the usual calibrating switch and standard cell may be provided for facilitating the adjustment of the resistance 55 as is required to establish the required potential drop across the slidewire resistance 49.

With the arrangement shown in Fig. 4, the potential and the polarity of potential impressed by the potentiometric measuring circuit 44 and the thermocouple 45 on the input circuit of the electronic valve including the control grid 7 depends upon the relation between the voltage of the thermocouple 45 and the potential difference between the potentiometric network points 46 and 47. The thermocouple 45 is so connected to the potentiometer circuit that the electromotive force of the thermocouple opposes the potential difference between the points 46 and 47. The potential difference between the points 46 and 47 is increased and decreased by movement of the contact 56 to the right and to the left, respectively. With a suitable adjustment of the contact 56, the potential difference between the points 46 and 47 will be equal and opposite to the electromotive force of the thermocouple 45, and accordingly, no potential will be impressed on the input circuit of valve 1 including the control grid 7 by the network 44 and thermocouple 45. On an increase in the thermocouple voltage above the potential difference between the network points 46 and 47 a potential of one polarity will be impressed on the said input circuit of valve 1 and such potential difference may then be eliminated by the suitable adjustment of the bridging contact 56 to the right. Conversely, when the voltage of the thermocouple falls below the potential difference between the network points 46 and 47, the resulting potential difference impressed upon the said input circuit of valve 1 may be eliminated by a suitable adjustment of the contact 56 to the left.

As diagrammatically illustrated, the bridging contact 56 is adjusted along the slidewire resistances 49 and 57 by the operation of a reversible electrical motor 58 shown as having its output shaft mechanically connected to a threaded shaft 59 on which is maintained a nut 60. The nut 60 supports the contact 56 so that upon rotation of the shaft 59, the contact 56 is longitudinally adjusted in one direction or the other according to the direction of rotation of the reversible motor 58. The motor 58 is a two-phase rotating field motor and has one phase winding 61 connected to and energized from the output terminals 63 and 64 of an electronic amplifier 62. The other phase winding 65 of motor 58 is connected to the alternating current supply source 21 through a condenser 66 of suitable value. The condenser 66 is so chosen that the current flow through the motor winding 65 will be displaced substantially 90° with respect to the voltage of the alternating current supply source 21.

The input terminals 67 and 68 of the electronic amplifier 62 are connected to the output terminals 17 and 20 of the electronic valve 1. As is explained hereinbefore in connection with Fig. 1 the alternating potential appearing at the terminals 17 and 20 will consist of an alternating current of twice the frequency of the source 21 when the unidirectional potential impressed upon the input circuit of the valve 1 including the control grid 7 is a predetermined value. In Fig. 4 the biasing resistor 12 is so chosen that when the potentiometric measuring circuit 44 is exactly balanced such a unidirectional potential will be impressed upon the control grid 7, and therefore in that case, an alternating potential of twice the frequency of the source 21 will appear at the terminals 17 and 20. This alternating potential is impressed on the input terminals 67 and 68 of the amplifier 62 and is amplified at the double frequency. The amplified quantity is impressed on the motor phase winding 61, but since it is twice the frequency of the alternating current applied to the motor phase winding 65 it is ineffective for the purpose of causing rotation of the motor 58. Accordingly, the motor 58 remains at rest.

Upon a change in thermocouple E. M. F. and the establishment of an unbalanced condition of the potentiometric network 44, however, the unidirectional negative potential impressed on the control grid 7 of the valve 1 will be increased or decreased depending upon the direction of the thermocouple potential change, and consequently, an alternating current of one phase or of opposite phase relatively to the voltage of the source 21 and of the same frequency will appear at the terminals 17 and 20. This alternating potential is amplified by the electronic amplifier 62 and the amplified quantity is impressed on the motor phase winding 61. In this case, the alternating current impressed on the motor winding 61 will be displaced 90° in one direction or the other relatively to the alternating current in the motor winding 65 depending upon the direction of change in the thermocouple electromotive force and will produce rotation of the motor 58 in a corresponding direction.

The electronic amplifier 62 shown diagrammatically in Fig. 4 for selectively controlling the rotation and direction of the reversible motor 58 in accordance with the direction of unbalance of the potentiometric network 44 may comprise any well-known type and for example may be like the electronic amplifier disclosed in the Wills application, Serial No. 421,173, filed December 1, 1941, for Measuring apparatus.

Fig. 5 is a diagrammatic representation of a Wheatstone bridge network which when unbalanced due to change in the magnitude of a condition under measurement produces a unidirectional potential of one polarity or of opposite polarity between the terminals 69 and 70 depending upon the condition obtaining in the unknown circuit designated by the reference character 71. If desired, the output terminals 69 and 70 of the Wheatstone bridge network of Fig. 5 may be connected to the input circuit of the electronic valve 1 including the control electrode 7 of Fig. 4 in lieu of the potentiometric network 44 and thermocouple 45, and the reversible motor 58 may be mechanically connected to the slidewire resistance 72 connected in one arm of the bridge network for adjusting the latter as required to restore the bridge network to a state of balance upon a change in condition in the unknown circuit 71. The Wheatstone bridge network of Fig. 5 includes resistances 72 and 73 in two opposed arms and includes the unknown resistance 71 and resistances 74 and 75 in a third arm. The resistance 72 and a resistance 76 comprised the fourth arm of the bridge. Energizing current is supplied the bridge network from a battery 77 through an adjustable resistance 78 which may be adjusted as is required to insure a current flow of the desired magnitude to the opposed branches of the bridge network.

It will be apparent that the reversible electrical motor 58 of Fig. 4 may be employed to operate a valve 79 positioned in a fuel supply pipe 80 for varying the supply of heating agent to the furnace 81 to the temperature of which the thermocouple 45 is responsive or preferably a separate reversible electrical motor may be so employed. For example, a reversible electrical motor 82 having two opposed field windings (not shown) may be used for this purpose. The reversible motor 82 is mechanically connected in any suitable manner to the valve 79 and is adapted to adjust the latter to its opened and closed positions depending upon the direction to which the motor 82 is energized for rotation. The mechanical connection of the motor 82 to the valve 79 is such as to increase and decrease the supply of heating agent to the furnace as the temperature of the latter falls below and rises above a predetermined level.

The motor 82 is energized for rotation in one direction or the other depending upon which of the two opposed field windings is energized by means of a switch 83. The switch 83 includes a switch arm 84 which is carried by the nut 60 but is insulated therefrom. The switch arm 84 is connected to one terminal of the alternating supply source 21. Alternating current flows from the switch arm 84 through either of two opposed contacts 85 or 86, conductors 87 or 88 and one field winding or the other of motor 82 to the other terminal of the supply source 21. Although not shown, the contacts 85 and 86 of the switch 83 are made adjustable so that both the control point setting and sensitivity of the apparatus may be set in a manner well known in the art.

While in accordance with the provision of the statutes, I have illustrated and described the best forms of embodiment of my invention now known to me, it will be apparent to those skilled in the art that changes may be made in said forms of embodiment without departing from the spirit of my invention as set forth in the appended claims, and that certain features of my invention may be used with advantage in some cases, without a corresponding use of other features.

Having now described my invention, what I claim as new and desire to secure by Letters Patent is as follows:

1. Measuring apparatus comprising a measuring circuit and a direct current potential producing device responsive to change in magnitude of a variable condition for unbalancing said circuit to an extent corresponding with said change, an impedance in said circuit adapted to be adjusted to rebalance said circuit, phase responsive means to adjust said impedance, and a single space discharge valve supplying a single output circuit, said output circuit being connected to said phase responsive means and having an input circuit on which the measuring circuit unbalanced potentials are directly impressed in substantially unmodified form, said space discharge valve being operative to produce an alternating potential of one phase or of opposite phase in the output circuit thereof depending upon the direction of the said unbalanced potentials.

2. Measuring apparatus comprising a measuring circuit and a direct current potential producing device responsive to change in magnitude of a variable condition for unbalancing said circuit to an extent corresponding with said change, an impedance in said circuit adapted to be adjusted to rebalance said circuit, a two-phase reversible electrical rotating field motor to adjust said impedance, means adapted to be connected to a source of alternating current to impress an alternating potential of predetermined phase to one phase of said motor, and a single space discharge device supplying a single output circuit, said output circuit being connected to the other phase of said motor and having an input circuit on which the measuring circuit unbalanced potentials are directly impressed in substantially unmodified form, said space discharge device being operative to produce an alternating potential in the output circuit thereof which leads or lags said first mentioned alternating potential by approximately 90° depending upon the direction of the said unbalanced potentials.

3. Measuring apparatus comprising a measuring circuit and a direct current potential producing device responsive to change in magnitude of a variable condition for unbalancing said circuit to an extent corresponding with said change, an impedance in said circuit adapted to be adjusted to rebalance said circuit, a phase responsive device to adjust said impedance, means to derive an alternating potential of predetermined frequency and of one phase or of opposite phase accordingly as said measuring circuit unbalanced in one direction or the other including an electric discharge device having a pair of control electrodes acting in tandem on a single electronic stream, means to vary the potential of one of said control electrodes in accordance with the state of balance of said measuring circuit, means adapted to be connected to a source of fluctuating current of said predetermined frequency to impress a fluctuating potential of said predetermined frequency on one of said control electrodes, and means to impress a fluctuating potential of said predetermined frequency but of opposite phase on the other of said control electrodes, and means to apply said derived alternating potential to said phase responsive means.

4. Measuring apparatus comprising a measuring circuit and a direct current potential producing device responsive to change in magnitude of a variable condition for unbalancing said circuit to an extent corresponding with said change, an impedance in said circuit adapted to be adjusted to rebalance said circuit, a phase responsive device to adjust said impedance, means to derive an alternating potential of predetermined frequency and of one or of opposite phase accordingly as said measuring circuit is unbalanced in one direction or the other including an electric discharge device having a pair of control electrodes acting in tandem on a single electronic stream, means to vary the potential of one of said control electrodes in accordance with the state of balance of said measuring circuit, means adapted to be connected to a source of alternating voltage of said predetermined frequency to impress an alternating potential of said predetermined frequency on one of said control electrodes, and means to impress an alternating potential of said predeterimend frequency but of opposite phase on the other of said control electrodes, means to amplify said derived alternating potential, and means to apply the amplified quantity to said phase responsive means.

5. Measuring apparatus comprising a measuring circuit and a direct current potential producing device responsive to change in magnitude of a variable condition for unbalancing said circuit to an extent corresponding with said change, an impedance in said circuit adapted to be adjusted to rebalance said circuit, a phase responsive device to adjust said impedance, means to derive an alternating component of current of predetermined frequency and of one phase or of opposite phase accordingly as said measuring circuit is unbalanced in one direction or the other including an electric discharge device having an anode, a cathode, a control grid and at least one auxiliary grid, a bias resistance connected in the cathode circuit of said device, means to produce a current flow in the anode-cathode circuit of said device and through said bias resistance, means adapted to be connected to a source of alternating voltage of said predetermined frequency to impress an alternating potential of said predetermined frequency on said control grid, means to control the potential of said auxiliary control grid in accordance with the state of balance of said measuring circuit, and means to impress at least a portion of the potential drop across said bias resistance on said auxiliary grid, and a connection to impress said derived alternating component of current on said phase responsive device.

6. Measuring apparatus comprising a measuring circuit and a direct current potential producing device responsive to change in magnitude of a variable condition for unbalancing said circuit to an extent corresponding with said change, an impedance in said circuit adapted to be adjusted to rebalance said circuit, a two-phase reversible electrical rotating field motor to adjust said impedance, means adapted to be connected to a source of alternating voltage of predetermined frequency to impress an alternating current of said predetermined frequency to one phase or said motor, means to derive an alternating current of said predeterimned frequency and displaced approximately 90° in one direction or the other with respect to said first mentioned alternating current accordingly as the measuring circuit unbalanced potentials are of one polarity or of the opposite polarity including an electric discharge device having an anode, a cathode, a control grid and at least one auxiliary grid, a bias resistance connected in the cathode circuit of said device, means to produce a current flow in the anode-cathode circuit of said device and through said bias resistance, means adapted to be connected to the first mentioned source of alternating voltage to impress an alternating potential of said predetermined frequency and of the same phase as said first mentioned alternating current on said control grid, means to impress the unbalanced measuring circuit potentials on the auxiliary grid of said discharge device, means to impress at least a portion of the potential drop across said bias resistance on said auxiliary grid, and means to control the other phase of said motor by said derived alternating current.

7. Means for producing an alternating component of current of predetermined frequency and of one phase or of opposite phase accordingly as a unidirectional potential of low intensity departs in one direction or the other from a predetermined value including an electric space discharge device having a pair of control electrodes acting in tandem on a single electronic stream, means to impress said unidirectional potential on one of said control electrodes, means adapted to be connected to a source of alternating voltage of said pedetermined frequency to impress an alternating potential of said predetermined frequency on one of said control electrodes, and means to impress an alternating potential of said predetermined frequency but of opposite phase on the other of said control electrodes.

8. Means for producing an alternating component of current of predetermined frequency and of one phase or of opposite phase accordingly as a unidirectional potential of low intensity departs in one direction or the other from a predetermined value including an electric discharge device having an anode, a cathode, a control grid and at least one auxiliary grid, a bias resistance connected in the cathode circuit of said device, means to produce a current flow in the anode-cathode circuit of said device and through said bias resistance, means adapted to be connected to a source of alternating voltage of said predetermined frequency to impress an alternating potential of said predetermined frequency and of the same phase as said first mentioned alternating current on said control grid, means to impress said unidirectional potential on said auxiliary grid, and means to impress at least a portion of the potential drop across said bias resistance on said auxiliary grid.

WILLIAM L. SHAFFER.